US008127910B2

(12) United States Patent
Hemphill et al.

(10) Patent No.: US 8,127,910 B2
(45) Date of Patent: Mar. 6, 2012

(54) LATCHING FRICTIONAL ENGAGEMENT ASSEMBLY USING A CHECK VALVE

(75) Inventors: Jeffrey Hemphill, Copley, OH (US); Philip George, Wooster, OH (US); Ross A. Gresley, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 753 days.

(21) Appl. No.: 12/283,321

(22) Filed: Sep. 11, 2008

(65) Prior Publication Data
US 2009/0071787 A1    Mar. 19, 2009

Related U.S. Application Data

(60) Provisional application No. 60/993,902, filed on Sep. 14, 2007.

(51) Int. Cl.
*F16D 25/12* (2006.01)
(52) U.S. Cl. ............... 192/85.63; 192/3.3; 137/493.6; 137/493.9
(58) Field of Classification Search .......... 192/3.3, 192/3.29, 85.27, 85.28, 106 F, 35.39, 85.24, 192/85.32, 85.63, 35, 391, 114 R; 137/493.6, 137/493.9
See application file for complete search history.

(56) References Cited

U.S. PATENT DOCUMENTS

| 4,040,339 | A  | * | 8/1977  | Ivey ........................ 192/85.24 X |
| 4,406,355 | A  | * | 9/1983  | Bionaz ........................... 192/3.3 |
| 5,125,323 | A  |   | 6/1992  | Yonezawa |
| 5,183,075 | A  | * | 2/1993  | Stein ........................... 137/493.6 |
| 5,361,880 | A  | * | 11/1994 | Bojas ........................ 192/3.29 X |
| 5,778,925 | A  |   | 7/1998  | Cooke |
| 5,782,327 | A  | * | 7/1998  | Otto et al. ...................... 192/3.29 |
| 6,062,358 | A  | * | 5/2000  | Otto et al. ...................... 192/3.29 |
| 6,273,228 | B1 | * | 8/2001  | Otto et al. ...................... 192/3.29 |
| 6,408,999 | B2 | * | 6/2002  | Otto et al. ...................... 192/3.29 |
| 6,464,059 | B1 | * | 10/2002 | Kundermann et al. 192/106 F X |
| 6,875,343 | B2 | * | 4/2005  | Druga ..................... 137/493.9 X |
| 7,021,447 | B2 | * | 4/2006  | Duwel ........................ 192/106 F |
| 7,246,692 | B2 | * | 7/2007  | Braford ................... 192/106 F X |
| 7,284,647 | B2 | * | 10/2007 | Onishi et al. ............ 192/106 F X |
| 7,389,861 | B2 | * | 6/2008  | Ackermann .................... 192/3.3 |
| 7,392,889 | B2 | * | 7/2008  | Ackermann ................ 192/3.29 |
| 7,588,130 | B2 | * | 9/2009  | Heuler et al. .................. 192/3.3 |
| 7,597,153 | B2 | * | 10/2009 | Thompson ............. 137/493.6 X |

(Continued)

OTHER PUBLICATIONS

U.S. Appl. No. 60/936,348, filed Jun. 20, 2007, Jayaram et al.

*Primary Examiner* — Gregory Binda
*Assistant Examiner* — Matthieu Setliff
(74) *Attorney, Agent, or Firm* — Simpson & Simpson, PLLC (57) ABSTRACT

A frictional engagement assembly for an automotive device, including: at least one frictionally engageable plate; a first piston plate displaceable in a first axial direction to urge the at least one frictionally engageable plate into frictional contact; a first resilient element engaged with the first piston plate and urging the first piston plate in a second axial direction substantially opposite the first axial direction; a check valve controlling fluid flow to displace the first piston plate; and an accumulator. As fluid from a chamber, at least partially formed by the first piston plate, discharges through the check valve, the accumulator controls fluid volume in the chamber to maintain a distal portion of the first piston plate, urging the at least one frictionally engageable plate into frictional contact, in a furthest position in the first axial direction.

16 Claims, 6 Drawing Sheets

U.S. PATENT DOCUMENTS

| | | | |
|---|---|---|---|
| 7,665,588 B2 * | 2/2010 | Menne | 192/3.3 |
| 7,841,458 B2 * | 11/2010 | Schneidewind | 192/106 F X |
| 7,918,315 B2 * | 4/2011 | Vu | 192/106 F X |
| 2005/0217962 A1 * | 10/2005 | Pedersen et al. | 192/106 F X |
| 2006/0124420 A1 * | 6/2006 | Ackermann | 192/3.29 |
| 2009/0139818 A1 * | 6/2009 | Ishikawa et al. | 192/3.29 |

* cited by examiner

LATCHING FRICTIONAL ENGAGEMENT ASSEMBLY USING A CHECK VALVE

CROSS-REFERENCE TO RELATED APPLICATIONS

This application claims the benefit under 35 U.S.C. §119(e) of U.S. Provisional Application No. 60/993,902 filed on Sep. 14, 2007 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a frictional engagement assembly that uses a check valve to reduce pump pressure requirements.

BACKGROUND OF THE INVENTION

It is known to maintain high fluid pressures, necessary to close a frictional engagement device, such as a wet clutch, during the closed operation of the device. Unfortunately, it requires energy to maintain the high pressures. For example, operating a fluid pump at high pressure to maintain a wet clutch in a transmission in a closed position can increase fuel consumption for a vehicle housing the transmission by 4-7%. Commonly owned U.S. Provisional Patent Application 60/936,348, filed Jun. 20, 2007, discloses a spring and wedge arrangement for blocking a fluid chamber to reduce the fluid pressure required from a pump supplying fluid for the chamber. This arrangement could be improved by decreasing the time lag between operating states for a clutch or other device using the arrangement. U.S. Pat. No. 5,125,323 (Yonezawa) discloses a check valve arrangement for feeding a hydraulic chamber. Unfortunately, Yonezawa does not disclose a mechanism to account for the undesirable loss of fluid from the chamber through the check valve as the check valve changes from an open position to a closed position. Yonezawa also discloses an undesirably complex arrangement for adjusting pressure in the chamber once the check valve is fully closed.

Thus, there is a long-felt need for an arrangement to reduce the fluid pressure necessary to maintain a frictional engagement device, such as a wet clutch, in a closed position, while compensating for undesired fluid exchange occurring during the closing of the frictional engagement device.

BRIEF SUMMARY OF THE INVENTION

The present invention broadly comprises a frictional engagement assembly for an automotive device, including: at least one frictionally engageable plate; a first piston plate displaceable in a first axial direction to urge the at least one frictionally engageable plate into frictional contact; a first resilient element engaged with the first piston plate and urging the first piston plate in a second axial direction substantially opposite the first axial direction; a check valve controlling fluid flow to displace the first piston plate; and an accumulator. As fluid from a chamber, at least partially formed by the first piston plate, discharges through the check valve, the accumulator controls fluid volume in the chamber to maintain a distal portion of the first piston plate, urging the at least one frictionally engageable plate into frictional contact, in a furthest position in the first axial direction.

In some aspects, the check valve includes a second resilient element engaged with an outlet side of an inner sleeve and the second resilient element exerts a first force. When a sum of a force exerted by a fluid pressure on the outlet side of the plate plus the first force is less than a sum of a force exerted by fluid pressure exerted on an inlet side of the inner sleeve, the inner sleeve is displaceable to a first position to enable fluid flow through the check valve to the chamber. When the sum is greater than a sum of a force exerted by fluid pressure exerted on the inlet side of the inner sleeve, the inner sleeve is displaceable to a second position to block fluid flow through the check valve. The accumulator controls fluid volume in the chamber as the inner sleeve translates from the first position to the second position.

In some aspects, when the distal portion of the first piston plate is in the furthest position in the first axial direction and the inner sleeve is in the first position, the first piston plate is positioned to create a first volume in the chamber, as the inner sleeve translates from the first position to the second position, the first piston plate flexes in the second direction to create a second volume in the chamber, and a difference between the first and second volumes is substantially equal to the fluid volume passing through the check valve from the chamber as the inner sleeve translates from the first position to the second position. In some aspects, the accumulator includes a second piston plate and a third resilient element engaged with the first and second piston plates, the third resilient element exerts a second force, the chamber is at least partially formed by the second piston plate, and the second piston plate is displaceable in the first axial direction to compress the third resilient element against the first piston plate as force exerted by fluid in the chamber on the second piston plate exceeds the second force. As the inner sleeve translates from the first position to the second position, the second plate displaces in the second direction and the third resilient element reacts against the first piston plate to maintain the distal portion of the first piston plate in the furthest position in the first axial direction.

In some aspects, the check valve includes a fourth resilient element applying a third force to a plate and a first orifice and the inner sleeve includes second and third orifices and at least one groove on an inner surface of the inner sleeve. When the inner sleeve is in the second position and force on an outlet side of the plate is less than a sum of the third force and force exerted by fluid pressure on an inlet side of the plate, the plate blocks the second orifice and when the inner sleeve is in the second position and the force on the outlet side of the plate is greater than the sum of the third force and force exerted by fluid pressure on the inlet side of the plate, the plate moves from the second orifice to enable flow from the chamber through the at least one groove and the first, second, and third orifices. At least one of the at least one groove or the first, second, or third orifices is sized to control a time period necessary to discharge fluid in the chamber.

The present invention also broadly comprises a method of controlling a frictional engagement in an automotive device, including the steps of: displacing a portion of a check valve to a first position to create an opening from a channel to a chamber at least partially formed by a first piston plate; flowing fluid through the check valve to the chamber; displacing, in response to flowing the fluid, the first piston plate in a first axial direction to urge at least one frictionally engageable plate into frictional engagement, such that a distal portion of the first piston plate, urging the at least one frictionally engageable plate into frictional engagement, is in a furthest position in the first axial direction; displacing the portion of the check valve to a second position to block the opening; and controlling fluid volume in the chamber to maintain the distal portion of the first piston plate in the furthest position as the portion translates from the first position to the second position.

In some aspects, controlling fluid volume in the chamber includes compensating for a fluid volume passing through the check valve from the chamber as the portion translates from the first position to the second position. In some aspects, controlling fluid volume in the chamber includes flexing the first piston plate to create a first volume in the chamber when the distal portion of the first piston plate is in the furthest position in the first axial direction and the portion is in the first position, and flexing the first piston plate in the second axial direction to create a second volume in the chamber as the portion translates from the first position to the second position, such that a difference between the first and second volumes is substantially equal to the fluid volume passing through the check valve from the chamber as the portion translates from the first position to the second position.

In some aspects, displacing the first piston plate in a first axial direction includes displacing, in response to flowing the fluid, a second piston plate to compress a second resilient element disposed between the first and second piston plates and controlling fluid volume in the chamber includes the second resilient element displacing the second plate in the second direction to maintain the distal portion of the first piston plate in the furthest position in the first axial direction as the portion translates from the first position to the second position. In some aspects, the automotive device is an automatic transmission or a torque converter. In some aspects, the frictional engagement assembly includes a wet clutch pack or a brake.

In some aspects, the check valve includes a first orifice and the portion includes a second orifice and at least one groove on an inner surface of the portion and, the method further includes: displacing a plate to close a third orifice in the portion when the portion is in the second position and force on an outlet side of the plate is less than force on an inlet side of the plate; displacing the plate to open the second orifice when the portion is in the second position and the force on the outlet side of the plate is greater than the force on the inlet side of the plate; and discharging the fluid in the chamber though the check valve in a time period according to a size of at least one of the at least one groove and the first, second, and third orifices.

It is a general object of the present invention to provide an arrangement and a method to reduce the fluid pressure necessary to maintain a frictional engagement device, such as a wet clutch, in a closed position, while compensating for undesired fluid exchange occurring during the closing of the frictional engagement device.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
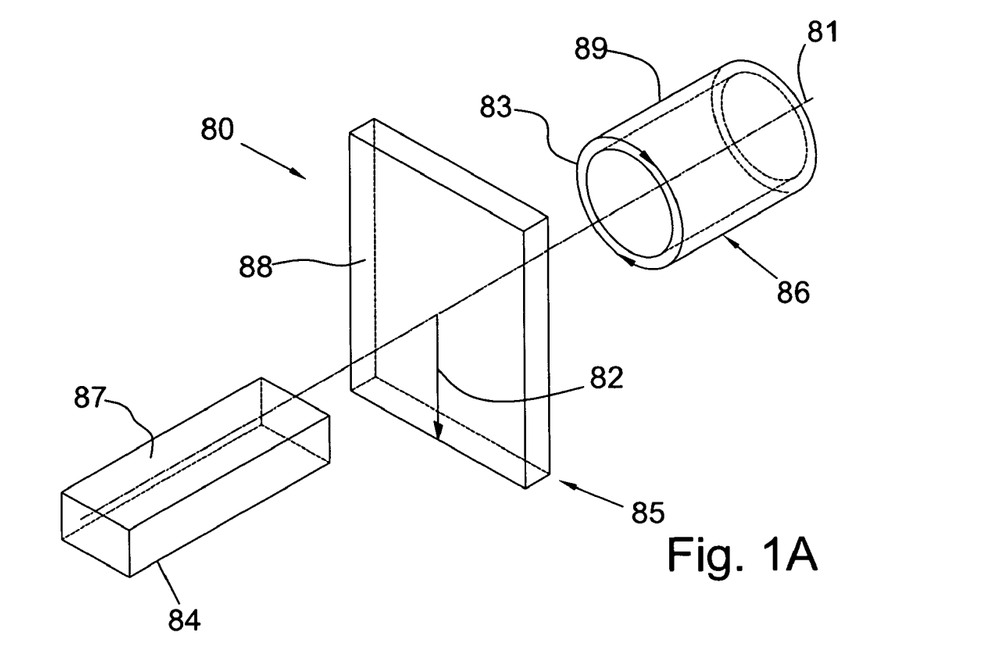
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
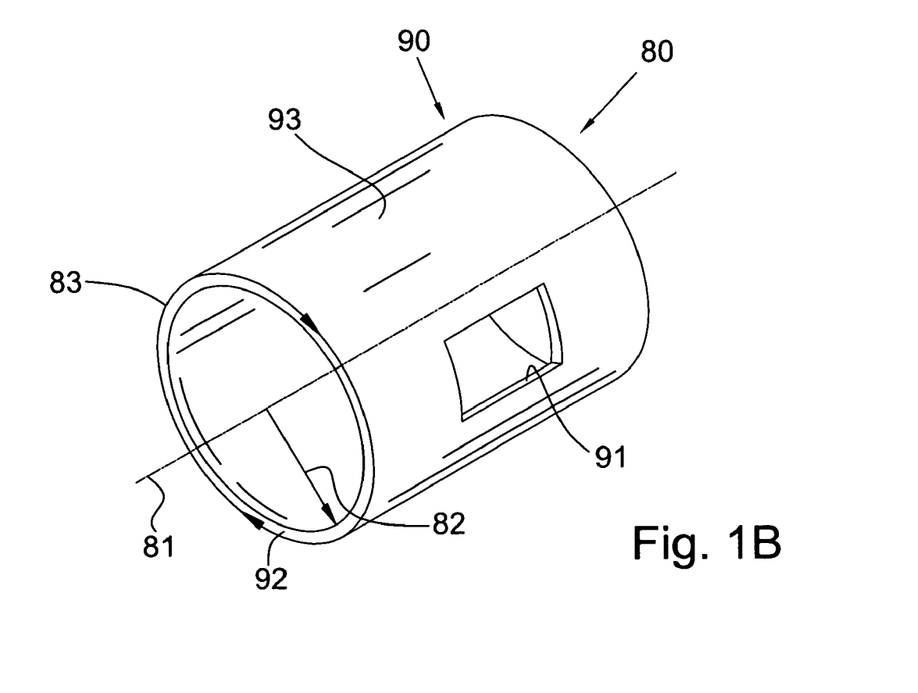
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
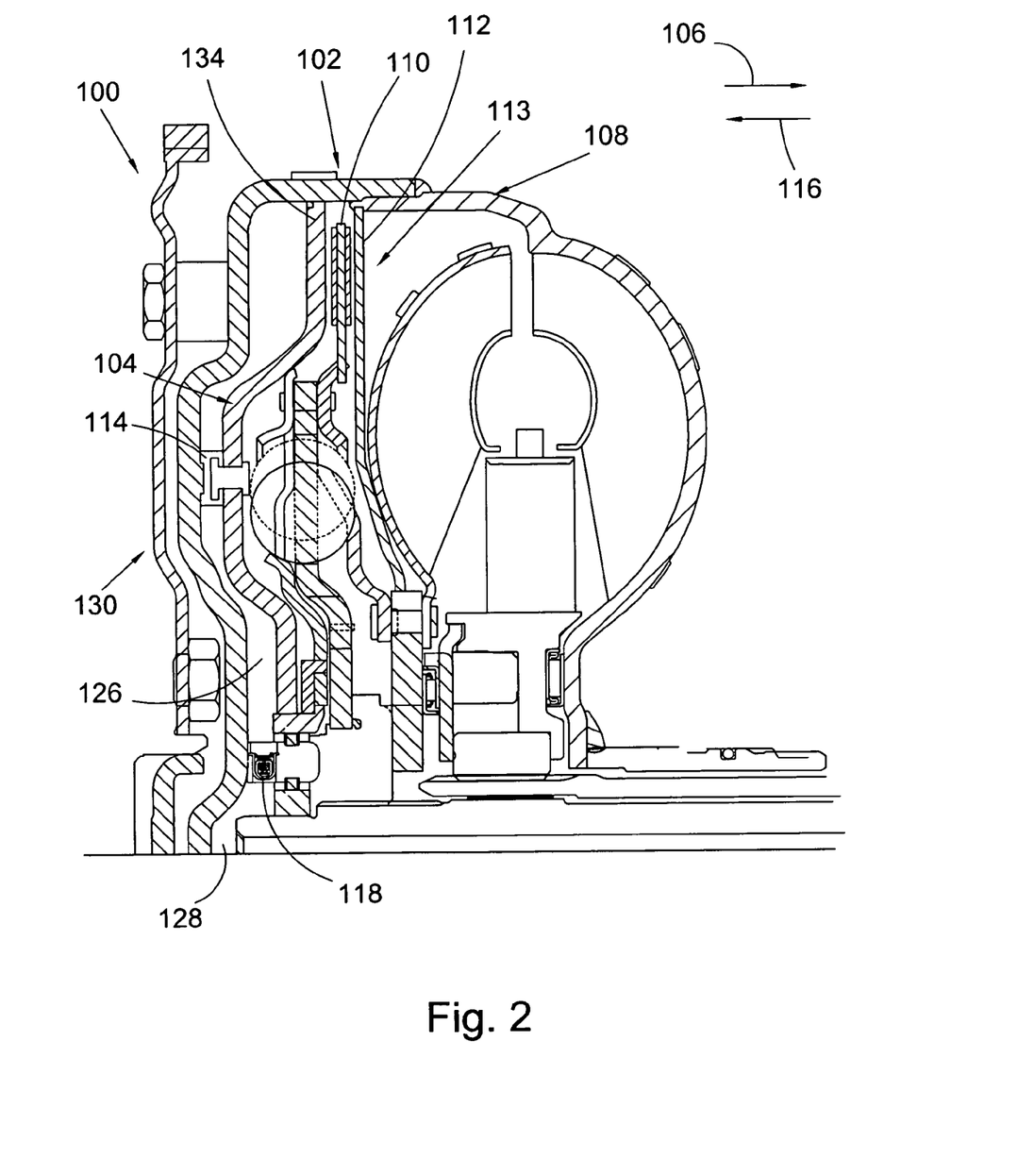
FIG. 2 is a partial cross-sectional view of a torque converter with a present invention frictional engagement assembly.

FIG. 2 is a partial cross-sectional view of a torque converter with a present invention frictional engagement assembly.

Figure 3:
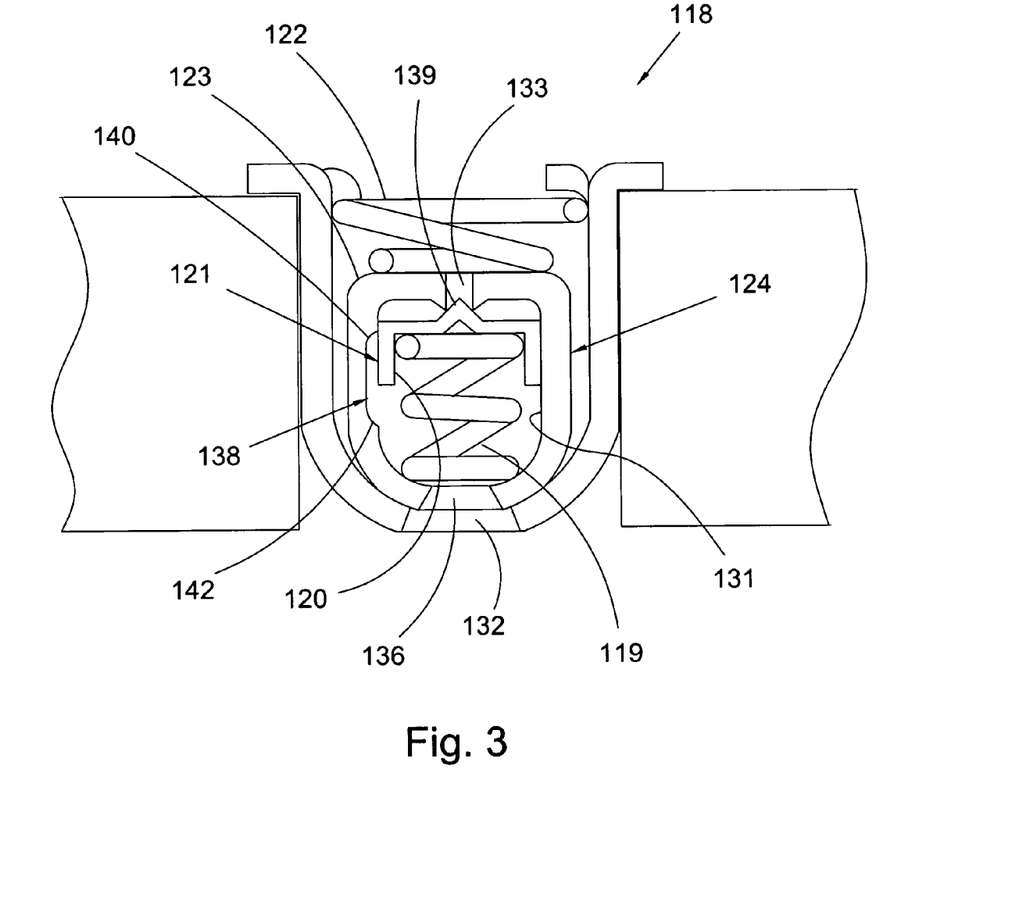
FIG. 3 is a cross-sectional view of the check valve shown in FIG. 2.

FIG. 3 is a cross-sectional view of the check valve shown in FIG. 2. The following should be viewed in light of FIGS. 2 and 3. Frictional engagement assembly 100 for an automotive device includes at least one frictionally engageable plate 102, and piston plate 104 displaceable in axial direction 106 to urge the at least one frictionally engageable plate into frictional contact. Assembly 100 can be a wet clutch or a brake. The discussion that follows is directed to a wet clutch; however, it should be understood that the discussion also is applicable to a brake. A present invention assembly can be used with any applicable automotive device known in the art. In some aspects, the automotive device is an automatic transmission or a torque converter. The discussion that follows is directed to torque converter 108; however, it should be understood that the discussion also is applicable to an automatic transmission. A present invention assembly is not limited to a particular number or type of frictionally engageable plates. In some aspects, plates 102 include clutch plate 110 and plate 112, included in wet clutch 113.

Assembly 100 includes resilient element 114 engaged with piston plate 104 and urging the piston plate in axial direction 116, substantially opposite axial direction 106. Resilient element 114 can be any resilient element known in the art. In some aspects, element 114 is a leaf spring. The assembly also includes check valve 118 with resilient element 119 engaged with inlet side 120 of plate, or poppet, 121. The check valve also includes resilient element 122 engaged with outlet side 123 of inner sleeve 124. Resilient elements 119 and 122 can be any resilient elements known in the art, for example, coil springs. The check valve controls fluid flow between chamber 126, at least partially formed by plate 104, and channel 128, thus controlling the displacement of piston plate 104. Assembly 100 also includes accumulator 130, which operates to compensate for fluid loss from chamber 126 when clutch 113 is closed and the check valve moves from an open position to a closed position.

The check valve operates as follows. When a sum of forces exerted by fluid pressure on inlet side 131 of the sleeve is greater than the force exerted by element 122 plus the force exerted by fluid pressure in chamber 126, the sleeve is displaceable to a first, or open, position (not shown) to enable fluid flow through the check valve to the chamber, as is known in the art. For example, the sleeve moves to enable flow through orifice 132. That is, the sleeve is not sealed around orifice 132 and fluid is able to flow through the orifice. The force on side 131 also moves the poppet against orifice 133, sealing the orifice. When the sum of the force exerted by the fluid pressure on the outlet side of the sleeve and the force exerted by element 122 is greater than the force exerted by fluid pressure exerted on the inlet side of the sleeve, the sleeve is displaceable to a second, or sealed, position to block fluid flow between chamber 126 and the channel. That is, the sleeve seals orifice 132. The further operation of plate 121 and element 119 is described infra.

The accumulator controls fluid volume in chamber 126 to maintain distal portion 134 of piston plate 104, which urges plates 102 into frictional contact, in a furthest position in axial direction 106, as the sleeve translates from the first position to the second position. That is, once chamber 126 is fully pressurized, plate 104 has displaced in direction 106, and portion 134 is holding clutch 113 closed, the accumulator ensures that portion 134 does not shift in direction 116, which would decrease the capacity of clutch 113, as the check valve closes. Alternately stated, the accumulator compensates for a fluid volume passing through the check valve from the chamber as the sleeve translates from the first position to the second position.

In some aspects, plate 104 includes the accumulator. That is, plate 104 operates to perform the accumulator function. For example, when distal portion 134 is in the furthest position in axial direction 106 and the sleeve is in the first position, the piston plate 104 is positioned to create a first volume in chamber 126. Plate 104 is at least partially flexible, and in response to fluid pressure in chamber 126, a portion of plate 104 flexes, for example, in direction 106 to form a portion of the first volume in chamber 126. When the sleeve translates from the first position to the second position (the chamber is fully pressurized), a certain volume of fluid passes from the chamber to the channel through the check valve. To compensate for this volume of fluid leaving the chamber, the piston plate flexes, for example, in the second direction to decrease the volume in the chamber. The decrease in volume due to the flexing of the piston plate is substantially equal to the volume of fluid passing through the check valve from the chamber. Thus, the entire piston plate, in particular, portion 134, is not forced to displace in direction 116 in response to the fluid volume change noted above and clutch 113 remains fully closed. That is, the capacity of the clutch is not reduced due to the fluid volume passing through the check valve.

Figure 4:
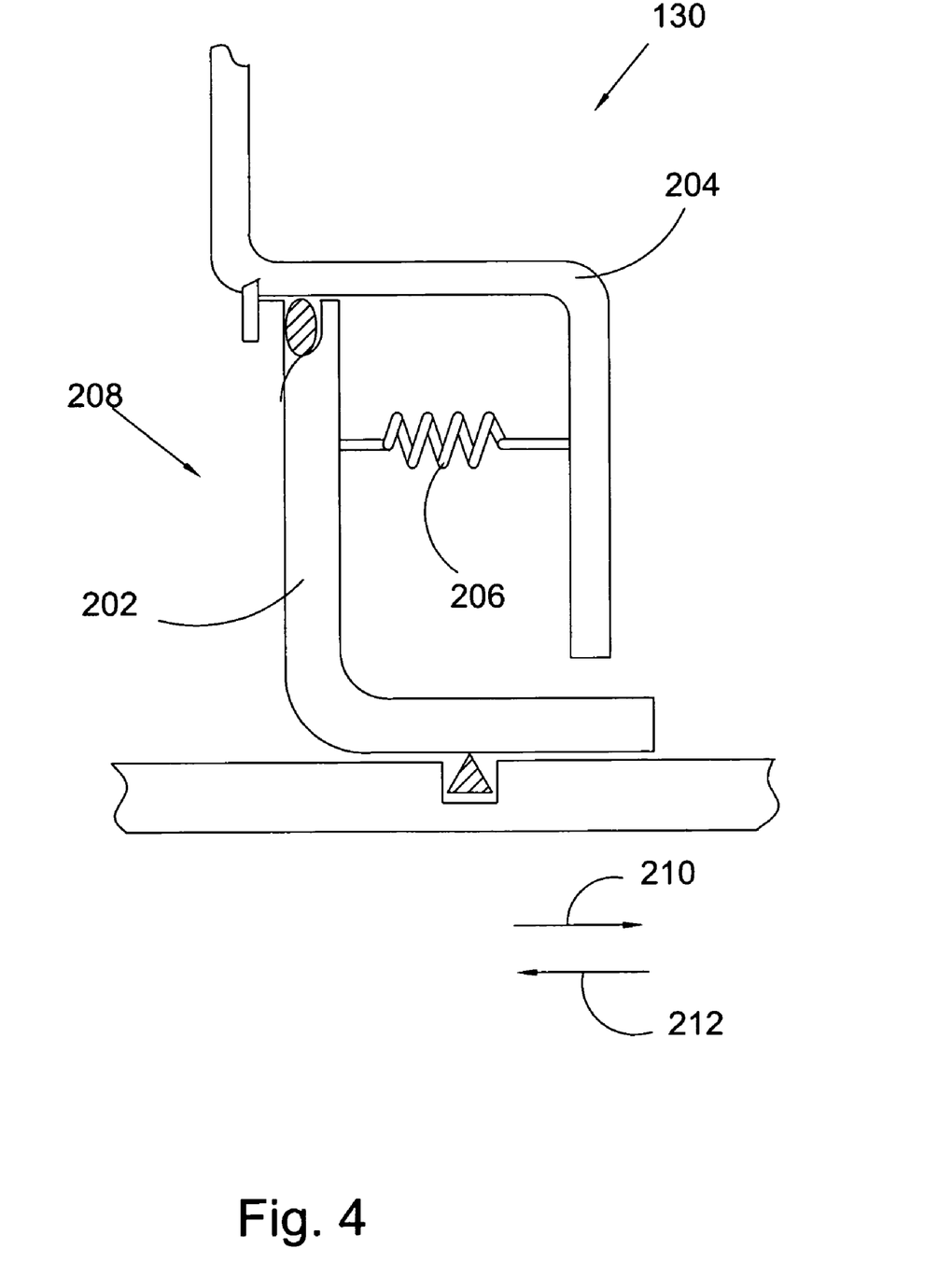
FIG. 4 is a cross-sectional view of an accumulator for a present invention frictional engagement assembly.

FIG. 4 is a cross-sectional view of an accumulator for a present invention frictional engagement assembly. In some aspects accumulator 130 includes piston plates 202 and 204 and resilient element 206 engaged with piston plates 202 and 204. Resilient element 206 can be any resilient element known in the art, for example, a coil spring, a diaphragm spring, or an elastomer spring. Piston plate 204 is engaged with frictionally engageable plates, for example, plates 102, (not shown), in particular, a distal portion of plate 204 is analogous to distal portion 134 shown in FIG. 2. Chamber 208 is at least partially formed by piston plate 202 and is in fluid communication with check valve 118 (not shown). In general, chamber 208 is analogous to chamber 126 in FIG. 2. Plate 202 is displaceable in axial direction 210 to compress the resilient element against piston plate 204 as force exerted by fluid pressure in the chamber on the piston plate 202 exceeds a force exerted by element 206, that is, as the force on the plate overcomes the resistance of the element. As element 206 is compressed, in some instances, after the element fully compresses, force exerted by fluid in chamber 208 is transferred from plate 202 to plate 204 and plate 204 displaces in direction 210 to frictionally engage plates 102.

Once chamber 208 is fully charged and plate 204 has closed the wet clutch, the sleeve in the check valve translates from the first position to the second position, with a subsequent loss of fluid from chamber 208 as described above for chamber 126. However, the accumulator controls fluid volume in chamber 208 to maintain the distal portion of piston plate 204 in a furthest position in axial direction 210, as the sleeve translates from the first position to the second position. That is, in response to the fluid flow out of the chamber, plate 202 displaces in axial direction 212 as resilient element 206 reacts against piston plate 204. The movement of plate 202 and the reactive force from element 206 act to maintain the axial position of plate 204, in particular, the distal portion of piston plate 204, so that the distal portion remains in the furthest position in the first axial direction. That is, the volume of fluid displaced by the movement of plate 202 is substantially equal to the volume of fluid passing from the chamber through the check valve.

In some aspects, orifices 132, 133, and 136, one or more grooves 138 on inner surface 131 of the inner sleeve, plate 124, and element 119 are used to discharge the chamber, for example, chamber 126. The check valve is not limited to a particular number, size, shape, or configuration of grooves. When the sum of forces exerted on inlet side 120 of the poppet by fluid pressure in the channel and element 119 is less than the sum of forces exerted on outlet side 139 of the poppet by fluid pressure in the chamber and element 122, the poppet moves away from orifice 133, unblocking the orifice. Then a fluid path is created from the chamber through orifice 133, through grooves 138, and through orifices 136 and 132 to the channel. When the poppet is blocking orifice 133, the poppet also seals against side 120, blocking fluid flow through the grooves. When the poppet unblocks orifice 133 and moves far enough toward orifices 136 and 132, the poppet uncovers top portion 140 of the grooves to create a fluid path from orifice 133 to the grooves, while leaving end 142 of the grooves open, that is, enabling flow through the grooves. In some aspects, instead of grooves in the inner sleeve, the inner sleeve is tapered such that when the poppet moves away from orifice 133, space is created between the poppet and side 131, enabling fluid flow past the poppet from orifice 133.

To maintain the chamber at a fully charged state, the poppet must be held against the inner sleeve to block orifice 133. The force to hold the poppet is provided by element 119 and the force exerted by fluid pressure on inlet side 120. The configuration of the check valve advantageously enables the use of a lower pressure in the channel to hold the poppet against the orifice. First, the force needed to hold the poppet in the sealed position is augmented by the force provided by element 119. Second, the area of the poppet receiving pressure from the fluid in the chamber is less than the area of the poppet receiving pressure from the fluid in the channel. Since force is a product of pressure and area, a fluid pressure in the channel results in a greater force on the poppet than the same fluid pressure in the chamber. For example, if fluid in chamber 126 is charged to 10 bars to engage clutch 113, and element 119 provides a force equal to 4 bars, then only slightly more than 6 bars of force due to fluid pressure in the channel need to be supplied by a pump (not shown) through channel 128 to hold the poppet in the closed position. Without element 119, the pump would need to supply fluid through channel 128 at a pressure sufficient to generate slightly more than 10 bars of force to keep the poppet in the sealed position.

Figure 5:
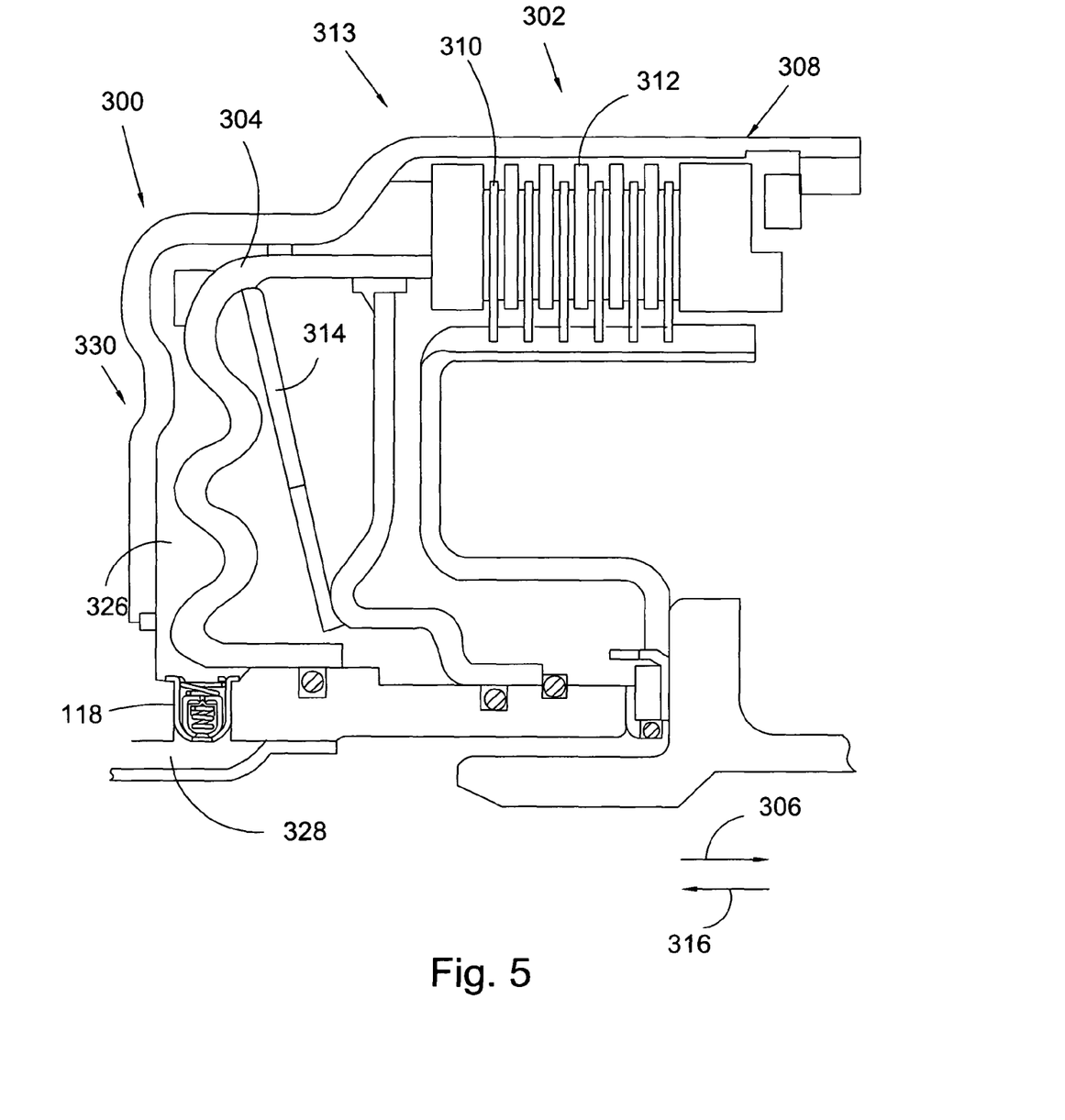
FIG. 5 is a partial cross-sectional view of a transmission with a present invention frictional engagement assembly; and, FIG. 6 is a diagram showing fluid pressures associated with use of a present invention frictional engagement assembly.

FIG. 5 is a partial cross-sectional view of a transmission with a present invention frictional engagement assembly. In general, the discussion of FIGS. 2 through 4 is applicable to FIG. 5. Frictional engagement assembly 300 for an automotive device includes at least one of frictionally engageable plate 302, and piston plate 304 displaceable in axial direction 306 to urge the at least one frictionally engageable plate into frictional contact. Assembly 300 can include a wet clutch or a brake, as described for assembly 100 supra. The discussion that follows is directed to transmission 308. In FIG. 5, plates 302 include clutch plates 310 and drive plates 312 and form wet clutch 313.

Assembly 300 includes resilient element 314 engaged with piston plate 304 and urging the piston plate in an axial direction 316, substantially opposite axial direction 306. Resilient element 314 can be any resilient element known in the art. In some aspects, element 314 is a diaphragm spring or a Belleville spring. The assembly also includes check valve 118. The check valve controls fluid flow between chamber 326, at least partially formed by plate 304, and channel 328, thus controlling the displacement of piston plate 304. Assembly 300 also includes accumulator 330, which operates to compensate for fluid loss from chamber 326 when clutch 313 is closed and the check valve moves from an open position to a closed position.

In some aspects, plate 304 is sufficiently flexible to perform the accumulator function described supra for plate 102. That is, plate 304 flexes in response to pressure in chamber 326. In some aspects (not shown), assembly 300 includes an accumulator with a double piston plate arrangement as shown in FIG. 4.

Figure 6:
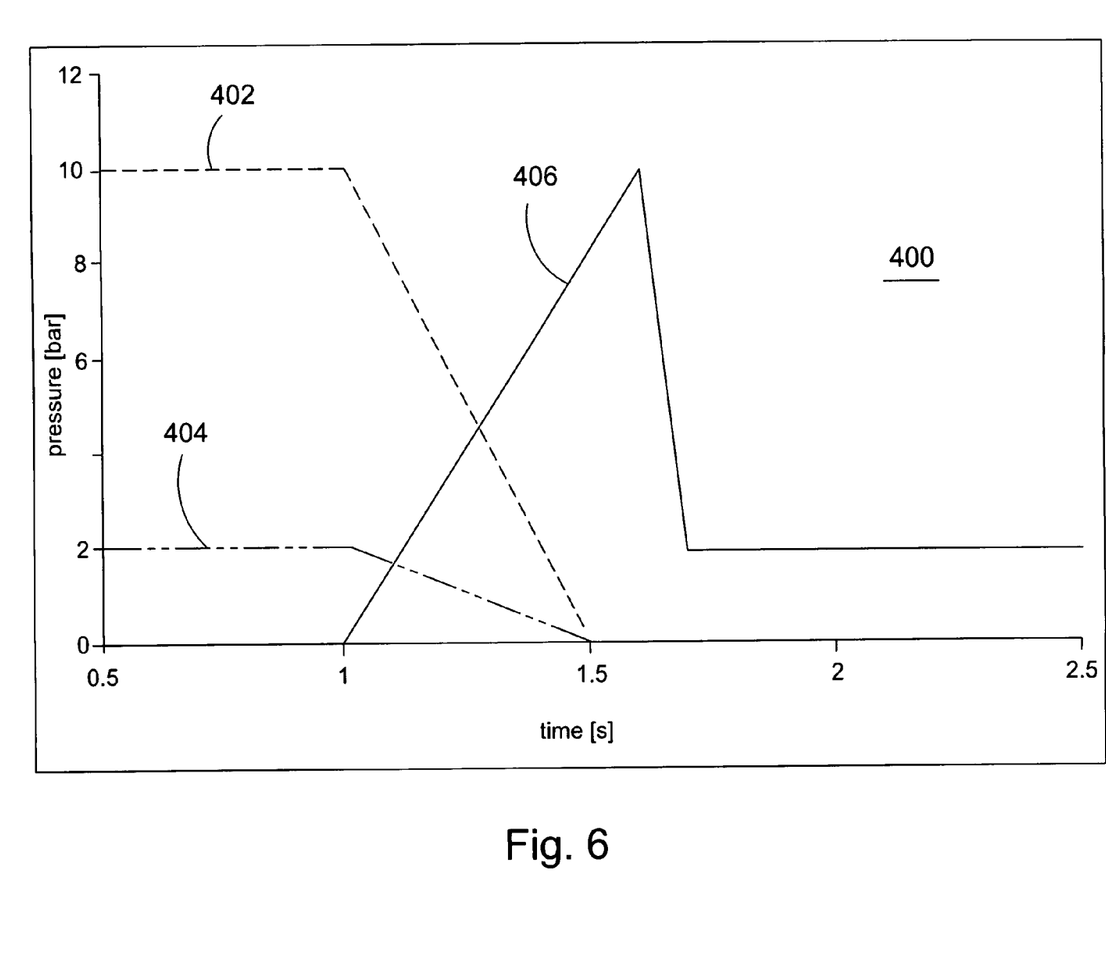

FIG. 6 is a graph showing fluid pressures associated with use of a present invention frictional engagement assembly. The following should be viewed in light of FIGS. 2 through 6, although the discussion is directed to a transmission as shown in FIG. 5. In some aspects, one or more of orifices 132, 133, 136 or grooves 138 are sized to control a fluid flow from chamber 326 to channel 328 through the check valve. This discharge occurs when the poppet is in the open position (orifice 133 is open). Specifically, the grooves or orifices control a time period necessary to vent chamber 326. This time period affects the transition time between gear shifts for transmission 308. For example, a shift to a new gear cannot be completed until the existing gear, for example, including wet clutch 313, is sufficiently disengaged. Clutch 313 is not sufficiently disengaged until chamber 326 is sufficiently discharged. It is desirable to translate plate 124 from a closed position to an open position (discharge the chamber) in about 0.5 seconds. Graph 400 shows line 402 representing pressure in chamber 326, line 404 representing the entry pressure, or pressure in channel 328, and line 406 represents the pressure in an ongoing clutch (not shown). As shown in graph 400, chamber 326 advantageously discharges in 0.5 seconds.

An automotive device is not limited to using a particular number of present invention frictional engagement assemblies. It also should be understood that an automotive device using a present invention frictional engagement assembly is not limited to the configuration shown in the figures.

The present invention also includes a method of controlling a frictional engagement in an automotive device. A first step displaces a portion of a check valve to a first position to create an opening from a channel to a chamber at least partially formed by a first piston plate. A second step flows fluid through the check valve to the chamber. A third step displaces, in response to flowing the fluid, the first piston plate in a first axial direction to urge at least one frictionally engageable plate into frictional engagement, such that a distal portion of the first piston plate, urging the at least one frictionally engageable plate into frictional engagement, is in a furthest position in the first axial direction. A fourth step displaces the portion of the check valve to a second position to block the opening. A fifth step controls fluid volume in the chamber to maintain the distal portion of the first piston plate in the furthest position as the portion translates from the first position to the second position.

In some aspects, controlling fluid volume in the chamber includes compensating for a fluid volume passing through the check valve from the chamber as the portion translates from the first position to the second position. In some aspects, controlling fluid volume in the chamber includes flexing the first piston plate to create a first volume in the chamber when the distal portion of the first piston plate is in the furthest position in the first axial direction and the portion is in the first position, and flexing the first piston plate in the second axial direction to create a second volume in the chamber as the portion translates from the first position to the second position, such that a difference between the first and second volumes is substantially equal to the fluid volume passing through the check valve from the chamber as the portion translates from the first position to the second position.

In some aspects, displacing the first piston plate in a first axial direction includes displacing, in response to flowing the fluid, a second piston plate to compress a second resilient element disposed between the first and second piston plates and controlling fluid volume in the chamber includes the second resilient element displacing the second plate in the second direction to maintain the distal portion of the first piston plate in the furthest position in the first axial direction as the portion translates from the first position to the second position. In some aspects, the automotive device is an automatic transmission or a torque converter. In some aspects, the frictional engagement assembly includes a wet clutch pack or a brake.

In some aspects, the check valve includes a first orifice and the method includes displacing a plate to close a second orifice in the portion when the portion is in the second position and force on an outlet side of the plate is less than force on an inlet side of the plate; displacing the plate to open the second orifice when the portion is in the second position and the force on the outlet side of the plate is greater than the force on the inlet side of the plate; and discharging the fluid in the chamber though the check valve in a time period according to a size of at least one of the first and second orifices.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A frictional engagement assembly for an automotive device, including:
   at least one frictionally engageable plate;
   a first piston plate displaceable in a first axial direction to urge the at least one frictionally engageable plate into frictional contact;
   a first resilient element engaged with the first piston plate and urging the first piston plate in a second axial direction substantially opposite the first axial direction;
   a check valve controlling fluid flow to displace the first piston plate; and,
   an accumulator, wherein, as fluid from a chamber, at least partially formed by the first piston plate, discharges through the check valve, the accumulator controls fluid volume in the chamber to maintain a distal portion of the first piston plate, urging the at least one frictionally engageable plate into frictional contact, in a furthest position in the first axial direction.

2. The frictional engagement assembly of claim 1 wherein the check valve includes a second resilient element engaged with an outlet side of an inner sleeve, wherein the second resilient element exerts a first force, wherein, when a sum of a force exerted by a fluid pressure on the outlet side of the plate plus the first force is less than a sum of a force exerted by fluid pressure exerted on an inlet side of the inner sleeve, the inner sleeve is displaceable to a first position to enable fluid flow through the check valve to the chamber, wherein, when the sum is greater than a sum of a force exerted by fluid pressure exerted on the inlet side of the inner sleeve, the inner sleeve is displaceable to a second position to block fluid flow through the check valve, and wherein the accumulator controls fluid volume in the chamber as the inner sleeve translates from the first position to the second position.

3. The frictional engagement assembly of claim 2 wherein when the distal portion of the first piston plate is in the furthest position in the first axial direction and the inner sleeve is in the first position, the first piston plate is positioned to create a first volume in the chamber, wherein as the inner sleeve translates from the first position to the second position, the first piston plate flexes in the second direction to create a second volume in the chamber, and wherein a difference between the first and second volumes is substantially equal to the fluid volume passing through the check valve from the chamber as the inner sleeve translates from the first position to the second position.

4. The frictional engagement assembly of claim 2 wherein the accumulator includes a second piston plate and a third resilient element engaged with the first and second piston plates, where the third resilient element exerts a second force, the chamber is at least partially formed by the second piston plate, and the second piston plate is displaceable in the first axial direction to compress the third resilient element against the first piston plate as force exerted by fluid in the chamber on the second piston plate exceeds the second force.

5. The frictional engagement assembly of claim 4 wherein as the inner sleeve translates from the first position to the second position, the second plate displaces in the second direction and the third resilient element reacts against the first piston plate to maintain the distal portion of the first piston plate in the furthest position in the first axial direction.

6. The frictional engagement assembly of claim 2 wherein the check valve includes a fourth resilient element applying a third force to a plate and a first orifice, wherein the inner sleeve includes second and third orifices and at least one groove on an inner surface of the inner sleeve, wherein when the inner sleeve is in the second position and force on an outlet side of the plate is less than a sum of the third force and force exerted by fluid pressure on an inlet side of the plate, the plate blocks the second orifice and when the inner sleeve is in the second position and the force on the outlet side of the plate is greater than the sum of the third force and force exerted by fluid pressure on the inlet side of the plate, the plate moves from the second orifice to enable flow from the chamber through the at least one groove and the first, second, and third orifices, and wherein at least one of the at least one groove and the first, second, and third orifices is sized to control a time period necessary to discharge fluid in the chamber.

7. The frictional engagement assembly of claim 1 wherein the automotive device is selected from the group consisting of an automatic transmission and a torque converter.

8. The frictional engagement assembly of claim 1 wherein the frictional engagement assembly includes a wet clutch pack or a brake.

9. A method of controlling a frictional engagement in an automotive device, including the steps of:
   displacing a portion of a check valve to a first position to create an opening from a channel to a chamber at least partially formed by a first piston plate;
   flowing fluid through the check valve to the chamber;
   displacing, in response to flowing the fluid, the first piston plate in a first axial direction to urge at least one frictionally engageable plate into frictional engagement, such that a distal portion of the first piston plate, urging the at least one frictionally engageable plate into frictional engagement, is in a furthest position in the first axial direction;

displacing the portion of the check valve to a second position to block the opening; and, controlling fluid volume in the chamber to maintain the distal portion of the first piston plate in the furthest position as the portion translates from the first position to the second position.

10. The method of claim 9 wherein controlling fluid volume in the chamber includes compensating for a fluid volume passing through the check valve from the chamber as the portion translates from the first position to the second position.

11. The method of claim 9 wherein controlling fluid volume in the chamber includes flexing the first piston plate to create a first volume in the chamber when the distal portion of the first piston plate is in the furthest position in the first axial direction and the portion is in the first position, and flexing the first piston plate in the second axial direction to create a second volume in the chamber as the portion translates from the first position to the second position, such that a difference between the first and second volumes is substantially equal to the fluid volume passing through the check valve from the chamber as the portion translates from the first position to the second position.

12. The method of claim 9 wherein displacing the first piston plate in a first axial direction includes displacing, in response to flowing the fluid, a second piston plate to compress a second resilient element disposed between the first and second piston plates and wherein controlling fluid volume in the chamber includes the second resilient element displacing the second plate in the second direction to maintain the distal portion of the first piston plate in the furthest position in the first axial direction as the portion translates from the first position to the second position.

13. The method of claim 9 wherein the automotive device is selected from the group consisting of an automatic transmission and a torque converter.

14. The method of claim 9 wherein the frictional engagement assembly includes a wet clutch pack or a brake.

15. The method of claim 9 wherein the check valve includes a first orifice and the portion includes a second orifice and at least one groove on an inner surface of the portion and, the method further including:

displacing a plate to close a third orifice in the portion when the portion is in the second position and force on an outlet side of the plate is less than force on an inlet side of the plate;

displacing the plate to open the third orifice when the portion is in the second position and the force on the outlet side of the plate is greater than the force on the inlet side of the plate; and, discharging the fluid in the chamber though the check valve in a time period according to a size of at least one of the at least one groove and the first, second, and third orifices.

16. A wet clutch pack assembly for an automotive device, including:

at least one frictionally engageable plate;

first and second piston plates displaceable in a first axial direction to urge the at least one frictionally engageable plate into frictional contact;

a check valve controlling fluid flow to displace the second piston plate; and, a resilient element engaged with the first and second piston plates, wherein, as fluid from a chamber, at least partially formed by the second piston plate, discharges through the check valve, the resilient element displaces the second plate in the second direction to control fluid volume in the chamber and the resilient element reacts against the first piston plate to maintain a distal portion of the first piston plate, urging the at least one frictionally engageable plate into frictional contact, in a furthest position in the first axial direction.

* * * * *